2 Sheets—Sheet 1.
F. SCHENCK.
Gun-Lock.
No 57,978.  Patented Sept. 11, 1866.
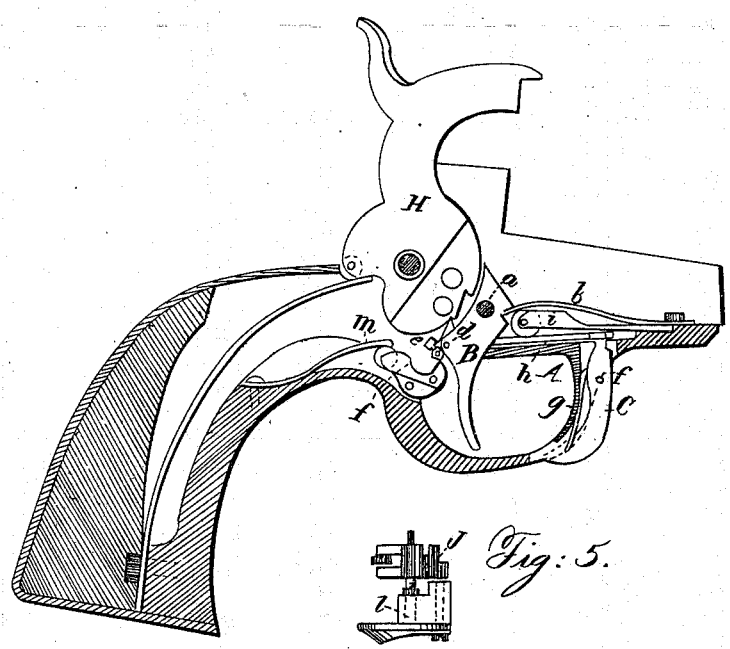
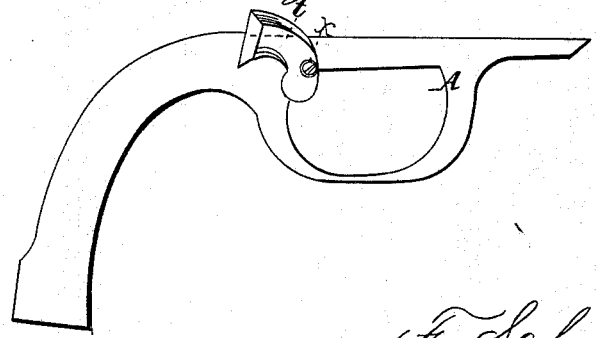

2 Sheets—Sheet 2.
F. SCHENCK.
Gun-Lock.
No. 57,978. Patented Sept. 11, 1866.
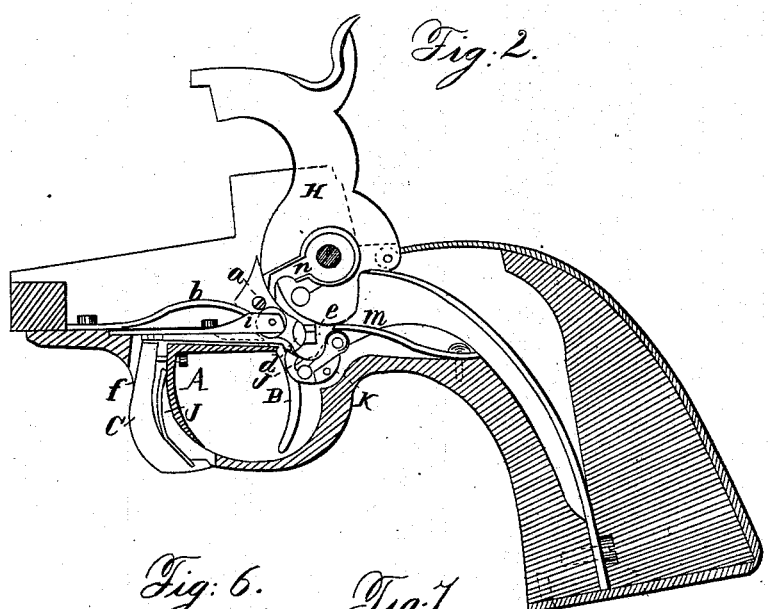
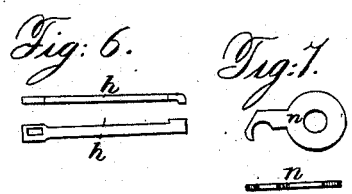
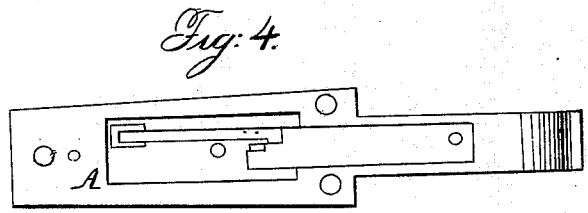
F. A. Jackson
Wm Treurn
F. Schenck
Per Munn & Co
Attorneys

UNITED STATES PATENT OFFICE.

F. SCHENCK, OF SAN ANTONIO, TEXAS.

IMPROVEMENT IN GUN-LOCKS.

Specification forming part of Letters Patent No. 57,978, dated September 11, 1866.

*To all whom it may concern:*

Be it known that I, F. SCHENCK, of San Antonio, in the county of Bexar and State of Texas, have invented a new and useful Improvement in Fire-Arms; and I do hereby declare that the following is a full, clear, and exact description thereof, which will enable others skilled in the art to make and use the same, reference being had to the accompanying drawings, forming part of this specification, in which—

Figure 1 represents a sectional elevation of this invention from one side. Fig. 2 is a similar elevation of the same from the opposite side. Fig. 3 is a detached elevation of the guard. Fig. 4 is a plan or top view of the same. Figs. 5, 6, and 7 are details which will be referred to as the description progresses.

Similar letters of reference indicate like parts.

This invention relates to the arrangement of a complete hair-trigger for Colt's revolving pistols, which is so constructed that it may be adjusted to any one of said pistols without the assistance of a gunsmith, the only tool required for the purpose being a screw-driver.

A represents the guard, the top plate of which is perforated with suitable mortises, as shown in Fig. 4 of the drawings, to receive the various parts of my lock. Through one of these mortises passes the main trigger B, which turns on the pivot $a$, and which is subjected to the action of a spring, $b$. Said trigger is provided with a movable tooth, $c$, which has its fulcrum on a pivot, $d$, and which is subjected to the action of a spring that has a tendency to turn it out to the position in which it is shown in Figs. 1 and 2 of the drawings.

From the inner end of the tooth projects a lip, which is bored and tapped to receive a screw, $e$, the object of which will be presently explained.

C is the hair-trigger, which has its fulcrum on a pivot, $f$, and which is subjected to the action of a spring, $g$. The upper end of this hair-trigger catches in a slide, $h$, which moves back and forth on the inner surface of the top plate of the guard, and which is held down on said plate by a roller-spring, $i$, as clearly shown in Figs. 1 and 2 of the drawings.

Detached views of the slide $h$ are shown in Fig. 6.

Said slide serves to retain a dog, $j$, which turns on a pivot, $k$, and a detailed perspective view of which is shown in Fig. 5. A thumb-piece, $l$, on the side of the guard or stock serves to turn said dog down to the position in which the same is shown in Fig. 2, and a spring, $m$, acting on a roller in the tail end of said dog has a tendency to carry the same back to its original position.

If the dog is turned down its point catches under the inner end of the slide $h$, and is retained by the same in the position in which it is shown in Fig. 2.

If the hammer is cocked a slight pressure on the hair-trigger C causes the slide $h$ to move back in the direction of the arrow marked thereon in Fig. 2, and thereby the dog $j$ is released and allowed to follow the action of the spring $m$. By this spring said dog is thrown violently in contact with the point of the screw $e$, and by this concussion the main trigger is disengaged from the notch in the hammer, and the hammer comes down and the charge is fired.

In order to prevent the main trigger from catching in the second notch a fly, $n$, is applied, which is suspended loosely from the pivot on which the hammer swings, and detached views of which are shown in Fig. 7.

If the hair-trigger is not to be used, the dog $j$ remains in its original position, in which it does not interfere with the motion of the main trigger, the tooth $a$ being yielding on its pivot $d$.

What I claim as new, and desire to secure by Letters Patent, is—

1. The spring-dog $j$ and slide $h$, in combination with the hair-trigger B and hammer H, constructed and operating substantially as and for the purpose described.

2. The yielding tooth $a$ in the main trigger to form a point of *appui* for the hair-trigger mechanism, substantially as herein set forth.

The above specification of my invention signed by me this 17th day of May, 1866.

F. SCHENCK.

Witnesses:
H. KLOCKE,
L. SCHULTZ.